Sept. 11, 1962 H. KLAUE 3,053,333
TRACK-LAYING VEHICLES, AND IN PARTICULAR
TO ARMORED VEHICLES
Filed Feb. 23, 1960
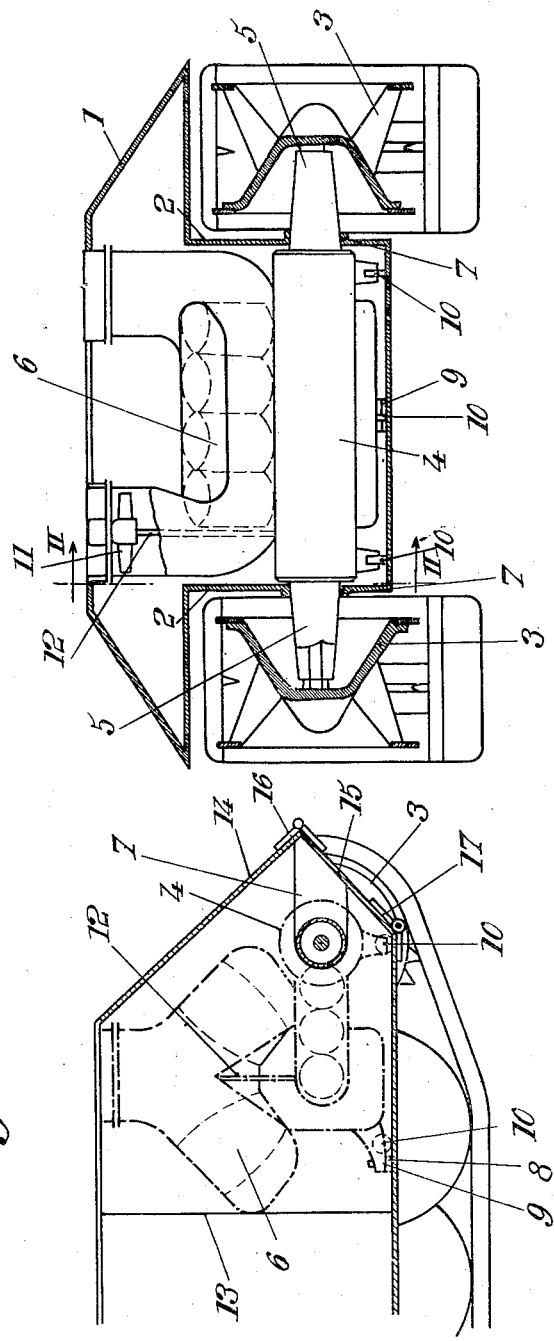
INVENTOR
HERMANN KLAUE
BY
ATTORNEY United States Patent Office 3,053,333
Patented Sept. 11, 1962

3,053,333
TRACK-LAYING VEHICLES, AND IN PARTICU-
LAR TO ARMORED VEHICLES
Hermann Klaue, Montreux-Clarens, Switzerland, assignor
to Brevets Aero-Mecaniques S.A., Geneva, Switzerland,
a society of Switzerland
Filed Feb. 23, 1960, Ser. No. 10,255
Claims priority, application Luxembourg Mar. 24, 1959
6 Claims. (Cl. 180—9.2)

The present invention relates to track laying vehicles, and in particular to armored vehicles of this type, having a rigid drive transmission casing which extends transversely to the fore-and-aft direction of the vehicle and carries at its ends the sprockets which drive the endless tracks, the body of such a vehicle including two longitudinal side walls. The object of the persent invention is to provide a vehicle of this type which is better adapted to meet the requirements of practice than those known at the present time.

For this purpose, according to the present invention, the side walls of the vehicle body extend about the axis of the drive transmission casing but are each provided with slots, preferably extending horizontally, along which can slide the corresponding ends of said casing, which extend outwardly through said slots, so that said casing can be brought from the outside of the vehicle body to its normal assembly position in said body, or on the contrary withdrawn from said body, fixation means being provided for securing said casing in said normal position with respect to said body so that a driving torque can be transmitted to the wheels and the reaction therefrom can be transmitted to the vehicle body for propelling it.

A preferred embodiment of the invention will be hereinafter described with reference to the appended drawings, given merely by way of example and in which:

FIG. 1 is a diagrammatic vertical section through the axis of the drive transmission casing of an armored track laying vehicle made according to the invention;

FIG. 2 is a vertical section on the line II—II of FIG. 1.

The armored vehicle shown by the drawing comprises an armored body having two vertical side walls 2. This body is supported by endless tracks in mesh with sprockets 3 driven by axles journalled in a transversely extending drive transmission casing 4 located in the rear part of the vehicle and which contains a change speed mechanism.

Up to the present time, when side walls 2 were to extend about the axis of the drive transmission casing (i.e. to the rear of said axis and above and below it) the axles of wheels 3 were each journalled in an outer casing, containing a speed reducing gear rigidly fixed on the respective outer faces of side walls 2. In order to permit a quick exchange of the drive transmission casing (and possibly of units such as the power plant proper and the change speed mechanism and steering gear associated with said casing) it was necessary to provide a disconnectable coupling joint between every output shaft mounted in the drive transmission casing and the input shaft of the speed reducing gear housed in the corresponding outer casing. Thus it was possible, after having disconnected the two coupling joints, to remove the drive transmission casing while leaving the outer casings in position.

However such an arrangement has the drawback of requiring a great rigidity of the side walls of the body at the places where the outer casings are fixed thereto, due to the very high stresses that must be transmitted by these outer casings when, according to the practice now in use, the endless tracks are of very great width.

The object of the present invention is to obviate this drawback and for this purpose, in particular, the outer casings 5, instead of being distinct from casing 4 and fixed to side walls 2, are integral with casing 4, thus constituting the end portions thereof.

Thus, the body 1 of the vehicle no longer has to support stresses other than those corresponding to the driving torque transmitted to the sprockets and to the thrust developed by said sprockets to propel the vehicle. As a matter of fact, the torque having a vertical axis to which the outer casing portions 5 have to resist is no longer transmitted to the side walls 2 of body 1 but is supported by casing 4, which may easily be made in the form of a rigid box-like structure capable of withstanding the action of this torque without any material deformation.

In order to permit an easy mounting in position, or withdrawal, of the drive transmission casing (which will be hereinafter supposed to carry the sprockets 3, which are mounted on the ends of the drive transmission shafts journalled in said casing, and, to belong, in conventional fashion, to a unit comprising in particular the power plant of the vehicle and transmission, steering and, possibly, braking, means) there is provided in each of the side walls 2 a horizontal slot 7 opening in the rearward direction. This slot is capable of accommodating the corresponding casing end portion 5 extending therethrough from the drive transmission casing central portion 4 to the outside of body 1. Thus said central casing 4 can be introduced from the outside into normal assembly position in body 1, or on the contrary withdrawn from said body.

Of course, in order to permit these displacements of the driving transmission unit and the parts rigid therewith, the rear wall of the vehicle body 1 must be provided with a gate 14—15.

When the unit above referred to (drive transmission casing 4—5 and power plant with accessory gears) has been brought to its normal position of assembly, detachable fixation means secure it to the vehicle body and ensure the necessary transmission of forces thereto. These fixation means consist of a lug 8 rigid with the removable unit and engaging a pin 9 rigid with the bottom of body 1.

Rollers 10 mounted on the central casing 4 facilitate the displacements of the removable unit with respect to body 1. The power plant shown by the drawing consists of an air cooled internal combustion engine 6 provided with a cooling air blower 11 driven through a vertical shaft 12. A partition 13 is provided between the power plant chamber and the inside of the vehicle.

The gate panels 14, 15 forming the rear wall of the vehicle body are assembled together by means of a horizontal hinge 16, the lower panel 15 being itself hinged at 17 to the bottom of body 1. Thus the upper panel 14 permits access to engine 6, located above casing 4, whereas the lower panel 15 closes the rear ends of slots 7.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A track laying vehicle which comprises, in combination, a body having two longitudinal side walls and a rear wall, a power plant including a drive transmission casing extending transversely to the fore-and-aft direction of the vehicle, endless tracks on one side and the other of said body, respectively, two sprockets in meshing engagement with said endless tracks respectively, drive transmission means in said casing adapted to be coupled with said sprockets respectively, said drive transmission casing comprising a central portion adapted to be housed in said body and two end portions adapted to extend to the outside of said side walls respectively, said side walls being provided with horizontal slots extending as far as the rear edges of said side walls respectively, said slots being adapted to accommodate said casing end portions, said casing end portions being freely slidable in said slots, and means for detachably securing said central casing portion to said body in the normal assembly position of said casing in said body, said body comprising an openable rear wall whereby said drive transmission casing can be withdrawn from said body, after said rear wall has been opened, by sliding said casing end portions in said slots.

2. A vehicle according to claim 1, in which said drive transmission casing is rigid with the remainder of the power plant, so that the whole power plant can be withdrawn from the vehicle body and introduced thereinto.

3. A vehicle according to claim 1 further including rolling means carried by said casing and adapted to run on the floor of said body.

4. A vehicle according to claim 1 comprising a gate to close said opening.

5. A vehicle according to claim 1 in which said opening consists of a gate including two panels, a lower one and an upper one, said lower panel being hinged to the rear edge of the bottom of said body about a horizontal axis, and said upper panel being hinged to the upper edge of said lower panel about a horizontal axis.

6. In a track laying vehicle having longitudinal side walls and having means for transmitting power from a power source inside said side walls to tracks on the outer sides of said side walls, the improvement comprising a unitary drive transmission casing extending transversely through both of said side walls, opposed horizontal slots defined in said side walls extending to the rear edges of said side walls, through which slots the said casing extends transversely, and means for detachably securing said drive casing at a forward position in said slots, the said casing and slots being co-operatively adapted for sliding said casing through said slots to withdraw the casing from the slots when detached.

References Cited in the file of this patent

UNITED STATES PATENTS

| | | |
|---|---|---|
| 1,572,943 | McKinley | Feb. 16, 1926 |
| 1,968,043 | Knox et al. | July 31, 1934 |
| 2,322,477 | Sjoberg | June 22, 1943 |
| 2,352,086 | Eberhard | June 20, 1944 |
| 2,406,288 | Hait | Aug. 20, 1946 |
| 2,426,816 | Busque | Sept. 2, 1947 |
| 2,861,642 | Hacker | Nov. 25, 1958 |

FOREIGN PATENTS

| | | |
|---|---|---|
| 535,268 | Great Britain | Apr. 3, 1941 |